Sept. 7, 1937. W. G. BURHANS Re. 20,494

FILTER CARTRIDGE AND CYLINDER

Original Filed Feb. 18, 1935 2 Sheets-Sheet 1

Inventor

W. G. Burhans

By Clarence O'Brien

Attorney

Sept. 7, 1937. W. G. BURHANS Re. 20,494

FILTER CARTRIDGE AND CYLINDER

Original Filed Feb. 18, 1935 2 Sheets-Sheet 2

Inventor

W. G. Burhans

By Clarence A. O'Brien

Attorney

Reissued Sept. 7, 1937

Re. 20,494

UNITED STATES PATENT OFFICE 20,494

FILTER CARTRIDGE AND CYLINDER

William G. Burhans, Kingston, N. Y.

Original No. 2,068,263, dated January 19, 1937, Serial No. 7,097, February 18, 1935. Application for reissue April 5, 1937, Serial No. 135,197

5 Claims. (Cl. 210—131)

This invention relates to a filter cartridge for use in a filter cylinder for filtering oils and the like, the general object of the invention being to form the body of the cartridge by a layer of wire mesh and a layer of waste material or the like, with the two layers rolled together to provide a substantially solid body, the body being placed in a bag of fabric and resting on a wire mesh bottom placed in the bottom of the bag.

Another object of the invention is to provide the body with a tubular core.

Another object of the invention is to provide a cylinder for a cartridge having a by-pass arrangement for by-passing the oil or other fluid around the cartridge when the pressure becomes excessive.

This invention also consists in certain other features of construction and in the combination and arrangement of several parts, to be hereinafter fully described, and illustrated in the accompanying drawings and specifically pointed out in the appended claims.

In describing the invention in detail, reference will be had to the accompanying drawings wherein like characters denote like or corresponding parts throughout the several views, and in which:—

Figure 1:
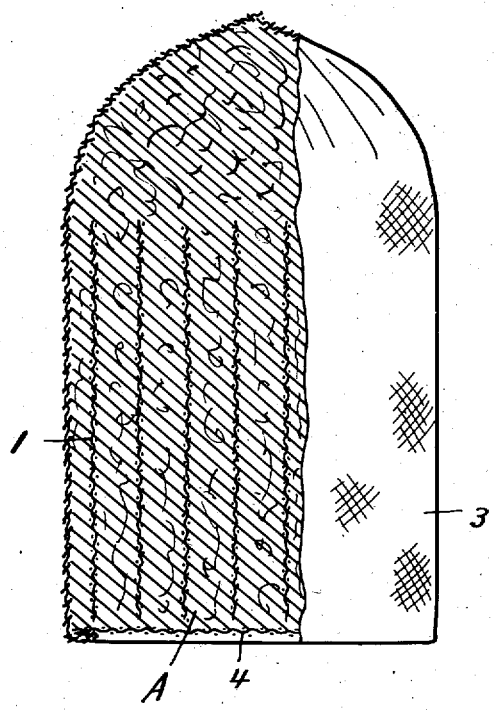
Fig. 1 is an elevation with parts in vertical section of the device.
Figure 2:
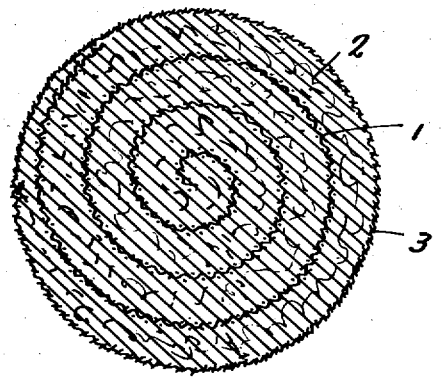
Fig. 2 is a transverse sectional view through Fig. 1.

As shown in these drawings, the letter A indicates the body of the filter cartridge which is composed of wire mesh 1 and waste material 2 or the like. In carrying out the invention, the layer of waste material is placed on the wire mesh and then the parts are rolled into a cylindrical body as will be seen from Figs. 1 and 2, the layers forming spirals. The body is placed in a bag 3 of fabric and a disk 4 of wire mesh is placed in the bottom of the bag before the body is put in place and I prefer to make the upper end of the cartridge of dome shape as shown in Fig. 1 with the upper end of the bag fitting snugly this part of the body and suitably fastened at its top as shown in Fig. 1.

Figure 3:
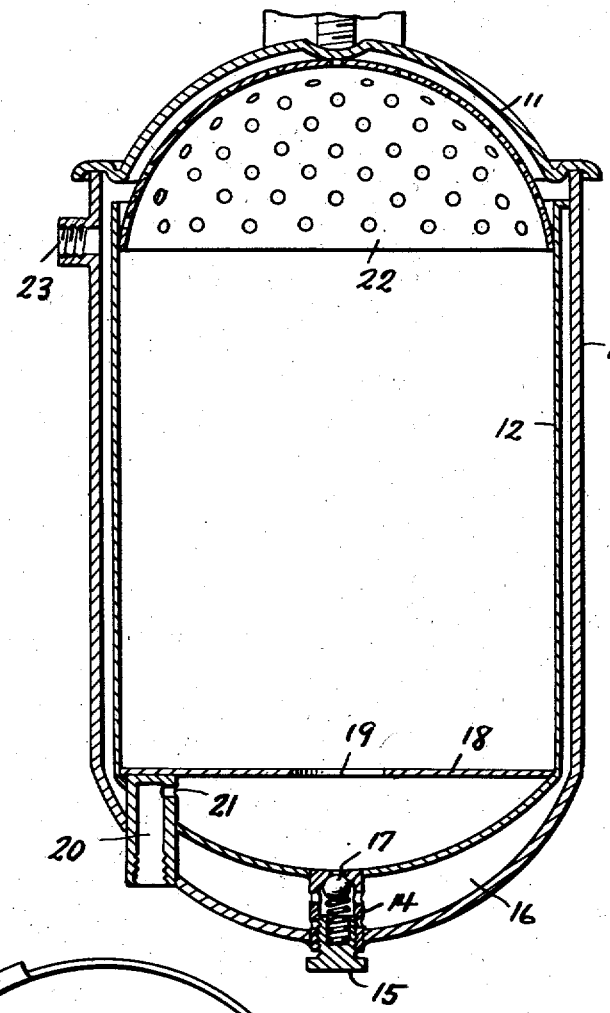
Fig. 3 is a vertical sectional view through the improved cylinder.
Figure 4:
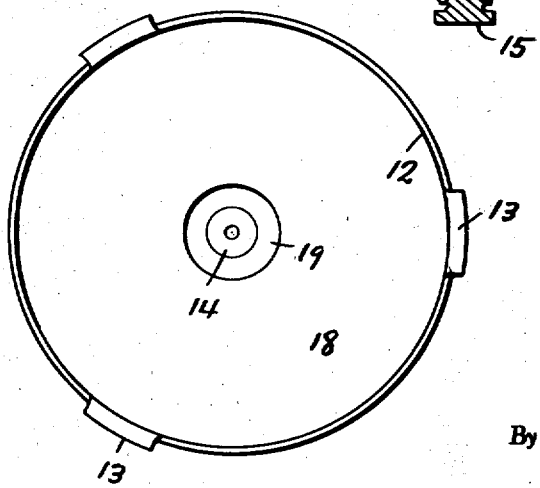
Fig. 4 is a top plan view of the inner member.

Figs. 3 and 4 show a cylinder for containing a cartridge and as shown in these views, the cylinder comprises an outer member or tank 10 having the cover 11 with means, not shown, for providing a tight juncture between the cover and the upper end of the tank and within this tank 10 is a smaller tank 12 which has lugs 13 at its upper end for engaging portions of the upper part of the tank 10 so as to space the tanks apart. Both tanks have rounded lower ends with their ends connected together by a perforated tube 14, the tube having a plug 15 threaded in its lower end. The perforations of the tube communicate with the space 16 between the bottoms of the tanks and a spring-pressed check valve 17 normally holds the bottom of the inner tank out of communication with the space 16 and the interior of the tube. A false bottom 18 is provided for the inner tank 12 above the rounded bottom thereof and has an opening 19 centrally arranged therein. An inlet nipple 20 extends through the two rounded bottoms of the tanks and is adapted to be connected to a source of supply and has a port 21 therein opening out into the space between the rounded bottom of the inner tank and the bottom 18. Of course, the cartridge is placed in the inner tank and rests upon the bottom 18, the top of the cartridge being covered by a perforated substantially semi-spherical member 22.

Thus the oil or other fluid flowing from the supply or other container will pass through the nipple 20 and discharge through the port 21 into the bottom of the inner tank and then pass through the opening 19 and through the cartridge and then through the member 22 and out through the outlet 23. When the pressure below the cartridge becomes excessive, said pressure will move the valve 17 off its seat so that the oil will bypass around the cartridge through the tube 14 and the space 16 and flow out through the outlet 23.

When it is desired to remove sediment from the bottom of the tank 10, the plug 15 can be removed together with the valve assembly and then the parts can be drained and the sediment will pass through the perforations in the tube 14.

The oil collecting in the space between the two tanks will act as a cooling medium for the oil passing through the device and as will be seen from Fig. 3, when the plug 15 is in position, it covers the lower perforations in the tube 14 so that the by-passed oil will not disturb the sediment in the bottom of the outer tank but when the plug 15 is removed, the oil and sediment will drain from the bottom of the outer tank through all the perforations in the tube 14.

It is thought from the foregoing description that the advantages and novel features of the invention will be readily apparent.

It is to be understood that changes may be made in the construction and in the combination and arrangement of the several parts, provided that such changes fall within the scope of the appended claims.

I claim:

1. In a filter device, a cartridge cylinder comprising an outer tank, an inner tank spaced from the outer tank, a discharge connection at the top of the outer tank, a filtering cartridge in said inner tank, means for introducing the fluid to be filtered into the bottom of the inner tank below the cartridge, a perforated tube connecting the bottoms of the two tanks together with the perforations connecting the interior of the tube with the space between the tanks, and a spring-pressed valve normally closing communication between the tube and the bottom of the inner tank.

2. In a filter device, a cartridge cylinder comprising an outer tank, an inner tank spaced from the outer tank, and having its top open and in communication with the top of the outer tank, a discharge connection at the top of the outer tank, a filtering cartridge in said inner tank, means for introducing the fluid to be filtered into the bottom of the inner tank below the cartridge and means for by-passing the fluid between the tanks when the pressure of the fluid at the bottom of the inner tank becomes excessive, such means comprising a perforated tube in communication with the bottom of the inner tank and the perforations placing the tube in communication with the space between the tanks, an adjustable spring-pressed valve normally closing communication between the tube and the bottom of the inner tank.

3. In a filter device, a cartridge cylinder comprising an outer tank, an inner tank spaced from the outer tank, a discharge connection at the top of the outer tank, a filtering cartridge in said inner tank, means for introducing the fluid to be filtered into the bottom of the inner tank below the cartridge, a perforated tube connected with the bottoms of the two tanks with its upper end in communication with the bottom of the inner tank, and the perforations connecting the interior of the tube with the space between the tanks, a valve for normally closing communication between the tube and the inner tank and opening when excessive pressure occurs in the bottom of the inner tank, some of the perforations in the tube being arranged in the upper portion thereof and some in the lower portion thereof and a plug closing the lower end of the tube and the lower perforations, said plug being removed when the tanks are to be drained.

4. In a filter device, a cartridge cylinder comprising an outer tank, an inner tank spaced from the walls of the outer tank and permanently secured to the outer tank to form an outer chamber, there being communication between the upper ends of the inner tank and chamber, a discharge connection for the chamber, a filtering cartridge removably located in said inner tank, means for introducing the fluid to be filtered into the bottom of the inner tank below the cartridge, and a connection between the bottom of the inner tank and the bottom of the chamber including a normally closed spring-pressed valve arrangement to normally prevent flow through the connection but to yield to permit flow therethrough when the pressure in the bottom of the inner tank exceeds a predetermined value, said connection containing the valve forming the sole communication between the bottoms of the inner and outer tanks and said discharge connection for the chamber being substantially above the bottom thereof so that liquid bypassed through the valve arrangement is subjected to a substantial path of upward flow in which settling of solid matter may occur.

5. In a filter device, a cartridge cylinder comprising an outer tank, means spaced from the walls of the outer tank and permanently secured to the outer tank to provide an outer chamber and an inner cartridge receiving chamber, there being communication between the upper ends of said chambers, a discharge connection for the outer chamber, a filtering cartridge removably located in said inner chamber, means for introducing the fluid to be filtered into the bottom of the inner chamber below the cartridge, and a connection between the bottom of the inner chamber and the bottom of the outer chamber including a normally closed spring-pressed valve arrangement to normally prevent flow through the connection but to yield to permit flow therethrough when the pressure in the bottom of the inner chamber exceeds a predetermined value, said connection containing the valve forming the sole communication between the bottoms of the inner and outer chambers and said discharge connection for the outer chamber being substantially above the bottom thereof so that liquid bypassed through the valve arrangement is subjected to a substantial path of upward flow in which settling of solid matter may occur.

WILLIAM G. BURHANS.